S. C. Maine,
Fire Extinguisher.
No. 91,459. Patented Jan. 15. 1869.
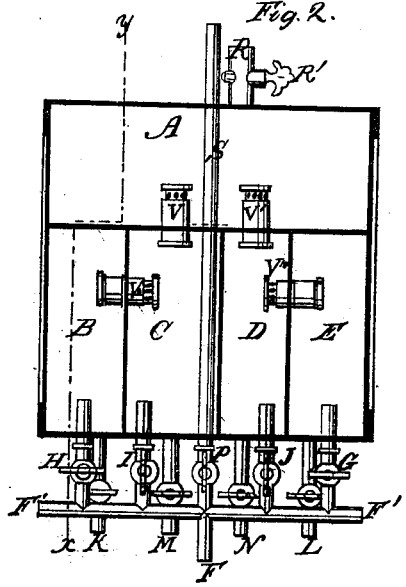
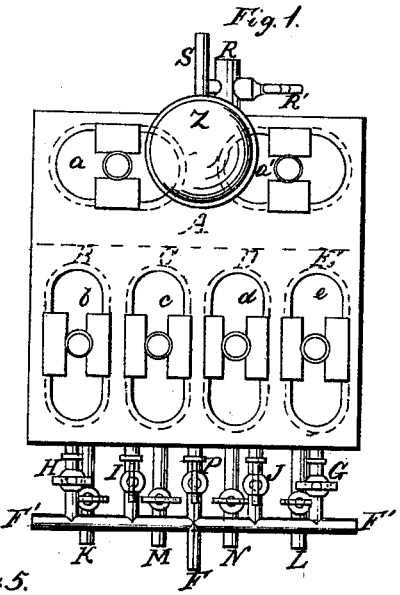
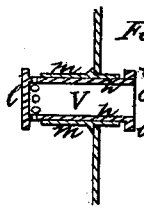
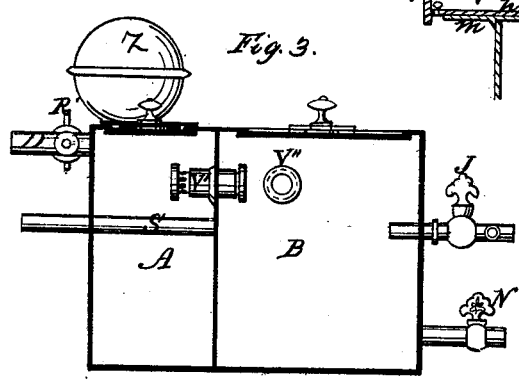
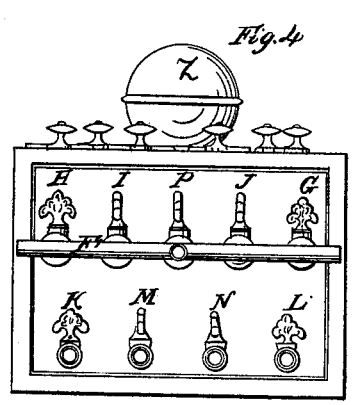
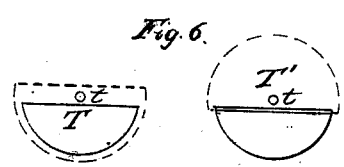
Witnesses.
Inventor.
S. C. Maine

UNITED STATES PATENT OFFICE.

S. C. MAINE, OF BOSTON, MASSACHUSETTS.

IMPROVEMENT IN FIRE-EXTINGUISHERS.

Specification forming part of Letters Patent No. 91,459, dated June 15, 1869.

*To all whom it may concern:*

Be it known that I, S. C. MAINE, of Boston, in the county of Suffolk and State of Massachusetts, have invented an Improved Apparatus for Extinguishing Fires; and do hereby declare the following to be a full, clear, and exact description thereof, reference being had to the accompanying drawing, in which—

Figure 1 is a plan view of my invention. Fig. 2 is a sectional plan view, showing inside construction, valves, &c. Fig. 3 is a transverse sectional view on line $xy$ of Fig. 2. Fig. 4 is a rear view, showing inlets and cocks for different chambers. Fig. 5 is a transverse section of valve. Fig. 6 shows modification or equivalent for closing chamber on top of apparatus. By the rear I mean the side shown in Fig. 4—by the front the opposite. The top is shown in Fig. 1—the right and left sides as looking at Fig. 4.

The object of my invention is to produce an apparatus which may be used in the same manner as the ordinary fire-extinguisher, but which shall be more efficient, and its operation be made to continue an indefinite length of time by means provided for recharging with the chemicals used, while the apparatus is in operation; also, an apparatus which may be used in connection with a hydrant or fire-engine, and which will allow clear water uninterrupted to be played upon the fire, or water charged with gas for quickly extinguishing the flames.

A great objection to the ordinary chemical fire-extinguisher is that, when once exhausted, its operation ceases till recharged. This I entirely overcome.

Another object of my invention is to keep the acids and alkalies, or whatever ingredients may be used for producing the proper gas, separated until the moment the effervescing is required. This overcomes the second great objection to ordinary extinguishers, that the chemicals are mixed at all times, thus continually exerting a pressure from within the case, which often results in the force of the gas becoming exhausted and the apparatus rendered useless, as the slightest hole in the case will cause a slow but complete exhaustion of power. This objection, also, as will be seen, I entirely overcome.

The nature of my invention consists in a case, which may be cylindrical or square, as shown in the drawings, or of any suitable shape and dimensions, having a number of compartments, one of larger capacity than the others, as an effervescing-chamber, or a chamber for the mixing of the ingredients for making the carbonic-acid gas, or any mixture that will extinguish flame. The other chambers contain the separate ingredients. Two of these chambers are connected, by self-acting valves, with each other and with the large chamber, while another pair is connected, in like manner, with each other and the large chamber. I have in all five chambers, one large one, common to all, and four smaller ones. The number may be increased, if desired; but the number shown is convenient for illustrating my invention.

My invention further consists in having suitable inlets for water, so arranged that any one chamber may be supplied alone or in connection with others.

It also consists in having an arrangement whereby water may be played directly through the apparatus without reference to the use of gas.

Referring to the drawings, A is the large chamber. B C D E are smaller chambers. Chambers B C are connected by valve $v''$. Chambers D E are connected by valve $v'''$. Chamber C is connected with mixing-chamber A by valve $v$. Chamber D is connected with mixing-chamber A by valve $v'$. F is an induction-pipe leading directly through the apparatus by pipe S. It has branch pipe F', extending each way from the main pipe. When cock P is shut, pipe F feeds through cocks H, I, J, and G, as desired. K, M, N, and L are exhaust-cocks to chambers B, C, D, and E, respectively. R is the outlet from the mixing-chamber A. This outlet has cock R'. Z is an air-chamber, fitted to chamber A, for safety. $a$ $a'$ $b$ $c$ $d$ $e$ are covers to chambers A B C D E. T is a modification, or an equivalent for $a$, $b$, $c$, $d$, or $e$. The construction of valves $v$ $v'$ $v''$ $v'''$ is the same and their action the same. This valve I believe to be new, and it plays an important part in my invention, and was only discovered after long study and varied experiments. It consists in a straight tube,

*m*. (See Fig. 5.) Into this tube *m* is fitted tube *h*. Tube *h* has on one end cap *l*, which projects over and covers tube *m*. In the periphery of tube *m*, near cap *l*, is a number of perforations, extending around the tube, as shown. On the opposite side of tube *h* is shoulder *i*. This tube *h* then plays within tube *m*, and it need not be a close fit, but must act easily and comparatively loose, provided the cap *l* fits, when shut down upon *m*, tightly upon its seat. The action of this valve is simple. It is closed when pressure comes upon cap *l*, and it is opened when pressure comes in at *o*, bearing against inside of cap *l*, and the shoulder *i* prevents the opening of the valve beyond the desired point.

In order to prevent these valves being opened too freely from pressure in A, I sometimes plug them; but this I leave for future patents.

I will now describe the operation and action of my invention.

First, as to its use as an ordinary fire-extinguisher. Charge chambers B and C with acid, and chambers D and E with alkalies, and when the ingredients in the chambers rise above the valves *v* and *v'* they open, and the chamber A is charged and the apparatus ready for action. Now, when supply in chamber A becomes exhausted, tip the apparatus upon its front—that is, so that chamber A shall come to the bottom, when the acid and alkali pass from chambers C and D to chamber A, and there are converted into a further supply of gas, which is played upon the fire through eduction-pipe R, regulated by cock R'. When the acid and alkali have produced gas, the pressure in chamber A will close valves *v* and *v'*, and the apparatus being again placed right side up, the chamber for receiving the ingredients may be recharged, and when the pressure of the gas becomes lower again invert the apparatus, and thus resupply the effervescing-chamber A. In using the apparatus in this manner the pipe R may be led from the right or left side of the chamber A.

Second, as to its use in connection with a fire-engine, hydrant, or any power for forcing water upon a fire; and it is this use for which I have particularly designed my invention, for cases often occur when a building of small value is burning, while the stock of goods in it is of great value, and the damage done is from water more than from fire. Therefore it becomes desirable to have a hogshead of water do the work of a large quantity, while it may be necessary to deluge the whole stock and building with water. Now, if a comparatively small quantity of water, played with the force of a fire-engine, could be impregnated with some substance antagonistic to fire, and without any prejudice to the full working of the fire-engine or hydrant, it becomes evident at once that the extent of a conflagration may be confined to very small limits, and when even a large quantity of water can thus be impregnated fire need not cover but a narrow field; and when, further, the supply of gas can be continually replenished the object of my invention is fully realized.

The operation is as follows: The apparatus is coupled into the hose of the engine or hydrant leading to the fire. Charge chambers B C with acid and chambers D E with alkali, as before; close cock P and open cocks H and G, which allows water to flow into chambers B and E, and carrying the ingredients contained in them through valves *v''* and *v'''*, and thence into mixing-chamber A, where they form gas. When sufficient gas is formed in chamber A the pressure closes valves *v* and *v'*. Now close cocks G and H and open cocks I and J; then the pressure of water from the hose coming into chambers C D alone, valves *v''* and *v'''* are closed. This leaves chambers B and E at liberty, and by opening lower cocks K and L the pressure is removed from the cap or cover of chambers B and E, when they can be removed and the chamber recharged while the apparatus is in action; and opening cocks G and H, closing I and J, the mixing-chamber can at once be resupplied with the ingredients necessary. The eduction-pipe R, which leads to the hose playing upon the fire, is regulated by cock R'. If, now, in using this apparatus in connection with an engine, it is not desired to employ gas, I close all the cocks, open cock P, and the water passes through S, no hindrance being offered to the free operation of the engine.

By keeping the ingredients for gas in separate chambers I can produce a larger volume of gas with one charging than can possibly be made from charges kept in an effervescent state.

I obviate the difficulty found in using pumps for supplying the apparatus. The difficulty of using pumps is from the pressure of the gases and by their corroding influence.

The air-chamber Z serves as a means of safety to the pressure in the chamber A, acting as a cushion against the pressure.

The covers to the different chambers, instead of being as shown in the construction of my invention, may be of the equivalent shown in Fig. 6—that is, a half-circle, turning half round, leaving one-half the area of the circle closed or open, as desired, the cover turning on pivot *t*.

I do not confine myself to any particular ingredients, but may use any chemical substances, liquid or solid, antagonistic to flame.

I sometimes, in using powder as ingredients, place a screen over the valves to prevent clogging; but I do not make this a part of my invention.

Having thus fully described my invention, what I claim as new, and desire to secure by Letters Patent, is—

1. The self opening and closing valve *v*, constructed and operating substantially as described.

2. The combination of chambers A, B, C, D, and E and valves $v\ v'\ v''\ v'''$, as and for the purpose described.

3. The combination of the chambers A B C D E, valves $v\ v'\ v''\ v'''$, cocks H I J G, and pipes F and F′, substantially as set forth.

4. The combination of chambers A, B, C, D, and E with covers $a\ a'\ b\ c\ d\ e$, or their equivalent, valves $v\ v'\ v''\ v'''$, cocks H I J G and K M N L, induction-pipe F, with branch pipe F′, pipe S′, cock P, outlet R, with cock R′, and air-chamber Z, all constructed and operating relatively to each other, substantially as and for the purpose set forth.

In testimony whereof I have signed my name to this specification in the presence of two subscribing witnesses.

S. C. MAINE.

Witnesses:
 CARROLL D. WRIGHT,
 M. S. G. WILDE.